Patented Nov. 10, 1953

2,658,888

UNITED STATES PATENT OFFICE 2,658,888

HETEROCYCLIC MONOAZODYESTUFFS

Ernst Fischer, Offenbach (Main), Germany, assignor to Farbwerke Hoechst A. G., vormals Meister Lucius und Brüning, Frankfurt am Main Hochst, Germany, a company of Germany No Drawing. Application July 28, 1951,
Serial No. 239,177

Claims priority, application Germany
August 3, 1950

5 Claims. (Cl. 260—164)

The present invention relates to water-insoluble monoazodyestuffs to be used as pigments.

More particularly, this invention relates to monoazodyestuffs of the general formula

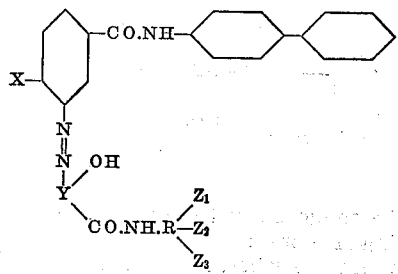

in which X indicates a substituent of the group consisting of alkyl, alkoxy and halogen; Y indicates a radical of the group consisting of carbazol, diphenylenoxide and diphenylensulfide wherein the hydroxy group and the azo group are in ortho-position to each other; R indicates an aryl radical of the group consisting of phenyl and naphthyl; $Z_1$, $Z_2$ and $Z_3$ each indicates a member of the group consisting of H, alkyl, alkoxy, halogen.

This invention especially relates to monoazodyestuffs of the general formula

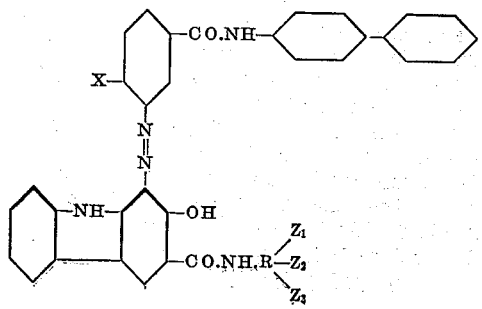

in which X indicates a substituent of the group consisting of alkyl, alkoxy and halogen; R indicates an aryl radical of the group consisting of phenyl and naphthyl; $Z_1$, $Z_2$ and $Z_3$ each indicates a member of the group consisting of H, alkyl, alkoxy and halogen.

I have found that the aforesaid dyestuffs can be manufactured by coupling a diazo compound of an amine of the general formula

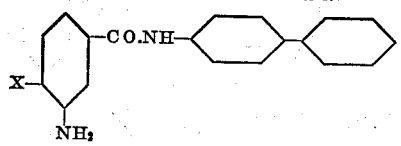

wherein X indicates a substituent of the group consisting of alkyl, alkoxy and halogen, with an arylide of 2-oxycarbazol-3-carboxylic acid, 3-oxydiphenyleneoxide-2-carboxylic acid or 3-oxydiphenylenesulfide-2-carboxylic acid, the compounds being so selected that they contain no water-solubilising groups, for example sulphonic acid or carboxylic acid groups.

It has been found that the water-insoluble monoazodyestuffs obtained according to my invention are especially suitable for the dyeing of plastic masses from high molecular organic compounds and for the manufacture of color lakes in the usual manner of mixing a pigment with carrier material or by effecting the coupling of the dyestuff components in the presence of a suitable carrier material for color lake production.

Besides the afore-mentioned objects, the present invention comprises plastic masses from high molecular organic compounds dyed with the afore-said dyestuffs, and color lakes prepared from such dyestuffs or by producing such dyestuffs in the presence of a suitable carrier material.

The new dyestuffs produced according to my invention yield brown, brown violet or blue grey color shades of good fastness properties.

They are suitable especially for the dyeing of plastic masses from high molecular organic compounds, for example condensation products from formaldehyde and urea, phenol or amines, vinyl compounds, rubber and so on and they can in addition find application with advantage for the manufacture of color lakes which are fast to oil and light, and also, by adding them to the spinning solutions, for the production of spun-dyed acetate artificial silk and viscose artificial silk.

The dyestuffs obtained according to the present process have the advantage over the known dyestuffs described in German patent specification No. 741,357, for the manufacture of which the same azo components are employed that they do not bleed out into undyed polymerisation products from vinyl chloride.

The following examples serve to illustrate the invention, but they are not intended to limit it thereto.

*Example 1*

15.9 parts by weight of 1-amino-2-methoxybenzene-5-carboxylic acid-4'-phenyl anilide are diazotised in the customary manner. Thereupon, for removal of the excess of mineral acid, the suspension of the diazo compound is treated with sodium acetate and then, with very good stirring, a solution of 16.9 parts by weight of 1-(2'-hydroxycarbazole-3'-carboylamino)-4-chlorobenzene in dilute caustic soda solution is caused to flow in. The coupling is completed by gradual heating to 40–50° C., whereupon the dyestuff produced is filtered off, well washed and dried. The dyestuff possesses the following structural formula:

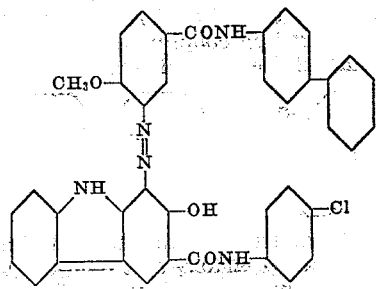

It constitutes a brown powder.

The application for the dyeing of polymerisation products from vinyl chloride may take place as follows:

100 parts by weight of a polymerisation product from vinyl chloride,
50 parts by weight of phthalic acid dibutyl ester(n), which acts as plasticising agent,
0.2 part by weight of titanium dioxide and
0.3 part by weight of the azo-dyestuff are mixed and then homogenised on a kneading roller for about 10 minutes at 140° C. There is obtained a mass of a similar consistency to soft rubber and of reddish brown colour, which does not bleed out into undyed polymerisation product and possesses a good fastness to light.

Together with, or instead of, titanium dioxide other customary filling materials employed for rubber compounding can be added to the mass before kneading.

By using instead of 15.9 parts by weight of 1-amino-2-methoxybenzene-5-carboxylic acid-4'-phenyl anilide 15.1 parts by weight of 1-amino-2-methylbenzene-5-carboxylic acid-4'-phenyl anilide, a dyestuff is obtained of similar good fastness properties but of which the color shade is very much more yellowish. It possesses the structural formula:

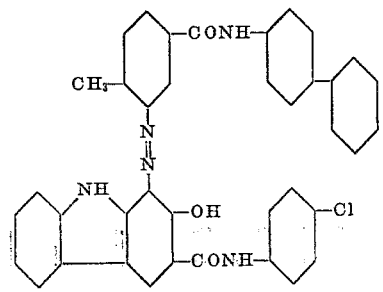

*Example 2*

15.9 parts by weight of 1-amino-2-methoxybenzene-5-carboxylic acid-4'-phenyl anilide are diazotised in the customary manner. Into the suspension of the diazo compound which has been neutralised to Congo red with sodium acetate, is stirred a solution of 18.2 parts by weight of 1-(3'-hydroxydiphenylene oxide-2'-carboylamino)-2:5-dimethoxybenzene in dilute caustic soda solution and the whole is then heated to 40–50° C. The grey dyestuff produced is filtered off, well washed and dried. It possesses the formula:

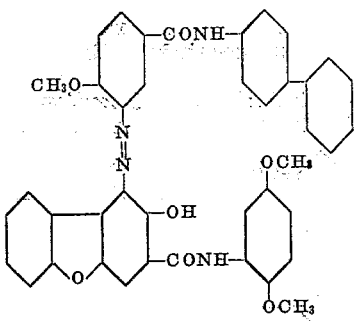

It can be employed in the following manner for the dyeing of rubber:

A mixture of rubber, filling materials, sulphur, vulcanisation accelerator and 2 per cent. of the azo dyestuff is incorporated on the roller. The mass is hot vulcanised in a press and then possesses a violettish-grey coloration which is of good fastness to light and neither bleeds into white rubber nor blooms out on the surface.

If a mixture of rubber, the customary additions and 0.5 per cent. of azo dyestuff is vulcanised cold by immersion in a solution of sulphur chloride in benzine, a dyeing of the same properties is produced.

*Example 3*

The dyestuff obtained by the method described in Example 1 from 15.9 parts by weight of 1-amino-2-methoxybenzene-5-carboxylic acid-4'-phenylanilide and 17.5 parts by weight of 1-(3'-hydroxydiphenylene sulphide-2'-carboxylamino)-2-methoxybenzene forms a grey violet powder by means of which, using the process also described in that example, polymerisation products from vinyl chloride can be dyed in grey blue shades fast to light. The dyeings do not bleed out into undyed polymerisation product. The dyestuff here employed possesses the structural formula:

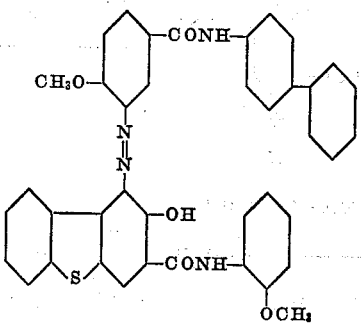

Example 4

From the diazo compound of 15.9 parts by weight of 1-amino-2-methoxybenzene - 5 - carboxylic acid-4'-phenyl anilide and 17.6 parts by weight of 2-(2'-hydroxycarbazole-3'-carboylamino)-naphthalene, by the method described in Examples 1 and 2, a brown dyestuff is obtained. It has the formula:

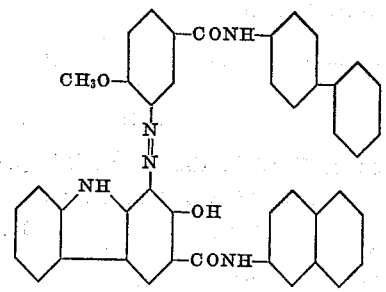

The lakes produced with this dyestuff yield violettish-brown shades of good fastness to oil and light.

The coupling can also be carried out in the presence of a suitable carrier material for color lake production.

Example 5

By employing in Example 1 instead of 16.9 parts by weight of 1-(2'-hydroxycarbazole-3'-carboylamino)-4-chlorobenzene 15.1 parts by weight of 1 - (2' - hydroxycarbazole-3'-carboylamino)-benzene, there is obtained a dyestuff of similar color shade. It possesses the structural formula:

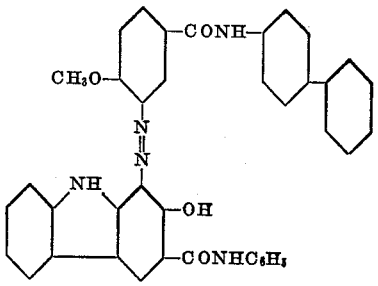

To 100 parts by weight of the condensation product from urea and formaldehyde, containing as filling material 30 per cent. of wood flour, 0.5 part by weight of this dyestuff is added and the whole is ground for 12 hours in a ball mill. The mass is subsequently employed for moulding, moulding and hardening to the desired shape taking place in 3 minutes at 180° C. under pressure.

The following table sets a number of further components applicable according to the present process together with the dyeing properties of the monoazo dyestuffs which are produced and which likewise possess good fastness properties:

| Diazo component | Azo component | Color shade |
|---|---|---|
| 1-amino-2-methoxybenzene-5-carboxylic acid-4'-phenyl anilide. | 1-(2'-hydroxycarbazole-3'-carboylamino)-4-methylbenzene. | Brown. |
| Do. | 1-(2'-hydroxycarbazole-3'-carboylamino)-4-bromobenzene. | Reddish brown. |
| 1-amino-2-chlorobenzene-5-carboxylic acid-4'-phenyl-anilide. | 1-(2'-hydroxycarbazole-3'-carboylamino)-4-chlorobenzene. | Yellowish brown. |
| 1-amino-2-bromobenzene-5-carboxylic acid-4'-phenyl-anilide. | do | Do. |
| 1-amino-2-methylbenzene-5-carboxylic acid-4'-phenyl-anilide. | 1-(2'-hydroxydiphenylene oxide-3'-carboylamino)-2-methoxybenzene. | Brown. |
| 1-amino-2-ethoxybenzene-5-carboxylic acid-4'-phenyl-anilide. | 1-(2'-hydroxydiphenylene oxide-3'-carboylamino)-2:5-dimethoxy-benzene. | Grey brown. |
| 1-amino-2-methoxybenzene-5-carboxylic acid-4'-phenyl anilide. | 1-(2'-hydroxydiphenyleneoxide-3'-carboylamino)-2:5-dimethoxy-4-chlorobenzene. | Do. |
| Do | 1-(2'-hydroxydiphenyleneoxide-3'-carboylamino)-2-methoxybenzene. | Reddish grey. |
| Do | 1-(3'-hydroxydiphenylenesulphide-2'-carboylamino)-2-ethylbenzene. | Blue grey. |
| Do | 1-(3'-hydroxydiphenylenesulphide-2'-carboylamino)-2-methyl-4-methoxybenzene. | Do. |
| Do | 1-(3'-hydroxydiphenylenesulphide-2'-carboylamino) - 2:5-dimethoxy-4-chlorobenzene. | Do. |
| Do | 1-(3'-hydroxydiphenylenesulphide-2'-carboylamino) - benzene. | Do. |

Since it is an object of the present invention to provide dyestuffs for plastic materials and for the production of color lakes it is advantageous and even necessary that the dyestuffs are insoluble in acids and alkalies. It therefore, is understood that the coupling and the diazonium components named in the appended claims do not contain groups which are known to reduce the stability of organic compounds to acids and alkalies and especially are free from sulfonic acid or carboxylic acid groups.

I claim:

1. The monoazodyestuffs of the following general formula

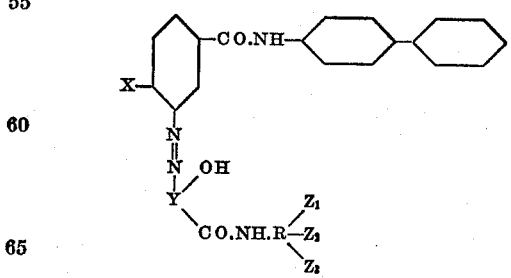

in which X indicates a substituent of the group consisting of alkyl, alkoxy and halogen; Y indicates a radical of the group consisting of carbazol, diphenylenoxide and diphenylensulfide wherein the hydroxy group and the azo group are in ortho-position to each other; R indicates an aryl radical of the group consisting of phenyl and naphthyl; $Z_1$, $Z_2$ and $Z_3$ each indicates a member of the group consisting of H, alkyl, alkoxy, halogen.

2. The monoazodyestuffs of the following general formula

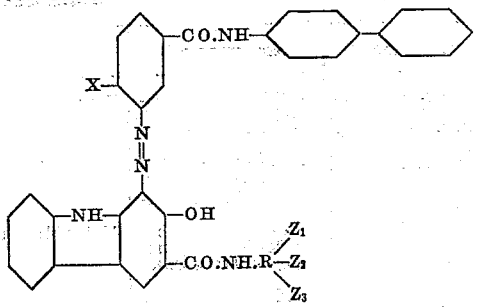

in which X indicates a substituent of the group consisting of alkyl, alkoxy and halogen; R indicates an aryl radical of the group consisting of phenyl and naphthyl; $Z_1$, $Z_2$ and $Z_3$ each indicates a member of the group consisting of H, alkyl, alkoxy and halogen.

3. The monoazodyestuffs of the following general formula

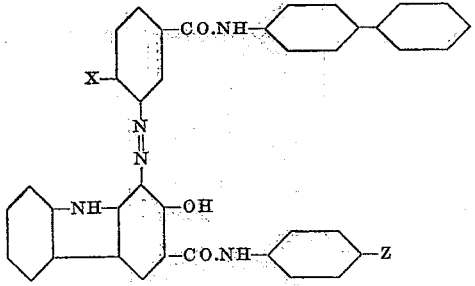

in which X indicates a substituent of the group consisting of methyl and methoxy and Z indicates a substituent of the group consisting of Cl, Br and methyl.

4. The monoazodyestuff of the following formula

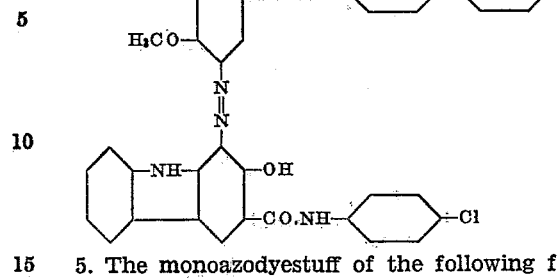

5. The monoazodyestuff of the following formula

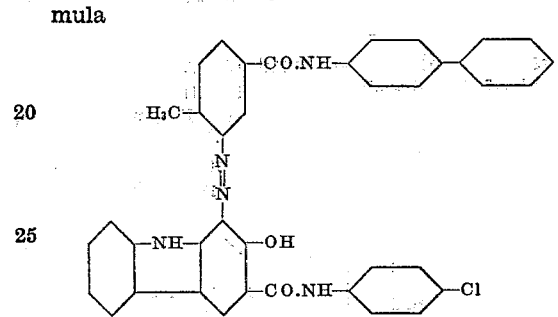

ERNST FISCHER.

References Cited in the file of this patent

UNITED STATES PATENTS

| Number | Name | Date |
|---|---|---|
| 2,204,958 | Fischer | June 18, 1940 |
| 2,222,763 | Fischer | Nov. 26, 1940 |

FOREIGN PATENTS

| Number | Country | Date |
|---|---|---|
| 741,357 | Germany | Nov. 10, 1943 |